United States Patent
Goodsitt et al.

(10) Patent No.: US 11,631,086 B2
(45) Date of Patent: *Apr. 18, 2023

(54) VALIDATION OF MODELS AND DATA FOR COMPLIANCE WITH LAWS

(71) Applicant: Capital One Services, LLC, McLean, VA (US)

(72) Inventors: Jeremy Edward Goodsitt, Champaign, IL (US); Austin Grant Walters, Savoy, IL (US); Fardin Abdi Taghi Abad, Champaign, IL (US); Vincent Pham, Champaign, IL (US); Anh Truong, Champaign, IL (US); Reza Farivar, Champaign, IL (US); Kate Key, Effingham, IL (US)

(73) Assignee: Capital One Services, LLC, McLean, VA (US)

( * ) Notice: Subject to any disclaimer, the term of this patent is extended or adjusted under 35 U.S.C. 154(b) by 324 days.

This patent is subject to a terminal disclaimer.

(21) Appl. No.: 17/020,094

(22) Filed: Sep. 14, 2020

(65) Prior Publication Data
US 2021/0065207 A1    Mar. 4, 2021

Related U.S. Application Data

(63) Continuation of application No. 16/537,867, filed on Aug. 12, 2019, now Pat. No. 10,776,793.

(51) Int. Cl.
| | | |
|---|---|---|
| G06Q 30/00 | (2012.01) | |
| G06N 3/04 | (2006.01) | |
| H04L 1/02 | (2006.01) | |
| G06N 5/00 | (2006.01) | |
| G06N 7/04 | (2006.01) | |
| G06N 3/08 | (2006.01) | |
| G06Q 30/018 | (2023.01) | |
| H04L 1/00 | (2006.01) | |

(52) U.S. Cl.
CPC ............. *G06Q 30/018* (2013.01); *G06N 3/04* (2013.01); *G06N 3/08* (2013.01); *G06N 5/003* (2013.01); *G06N 7/046* (2013.01); *H04L 1/002* (2013.01)

(58) Field of Classification Search
CPC ............ G06N 3/04; G06N 3/08; G06N 5/003; G06N 7/046
See application file for complete search history.

(56) References Cited

U.S. PATENT DOCUMENTS

2018/0089567 A1*    3/2018    Marascu ................ G06N 5/045

OTHER PUBLICATIONS

Jun_ Namikawa, "A model for learning to segment temporal sequences, utilizing a mixture of RNN experts together with adaptive variance" (Year: 2008).*

(Continued)

*Primary Examiner* — Ann J Lo
*Assistant Examiner* — Van C Mang
(74) *Attorney, Agent, or Firm* — KDW Firm PLLC

(57) ABSTRACT

The present disclosure provides computing systems and techniques for validating a decision model against a cannon of regulation. A server can deconstruct a decision model into a number of branching decisions and also generate a Markov chain comprising a number of sequences from a cannon of regulation. The server can compare the branching decisions to the sequences and can validate the decision model with the cannon of regulation based on the comparison.

20 Claims, 7 Drawing Sheets

(56) References Cited

OTHER PUBLICATIONS

Geetika Lakshmanan, "A Markov prediction model for data-driven semi-structured business processes", Springer-verlag London 2013 (Year: 2013).*
Dimitrii Babaev, "E.T.-RNN: Applying Deep Learning to Credit Loan Applications", ACM pp. 2183-2190, 2019 (Year: 2019).*
Jun Namikawa, "A Model for learning to segment temporal sequences, utlizing a mixture of RNN experts together with adaptive variance", pp. 1-18, 2008 (Year: 2008).*

* cited by examiner ic application. Memory 120 may
further store canon of regulation 124, decision model 150,
Markov chain 160, and sequence generation model 128.

VALIDATION OF MODELS AND DATA FOR COMPLIANCE WITH LAWS

RELATED APPLICATIONS

This application is a continuation of U.S. patent application Ser. No. 16/537,867, filed Aug. 12, 2019, titled "VALIDATION OF MODELS AND DATA FOR COMPLIANCE WITH LAWS". The contents of the aforementioned application are incorporated herein by reference in their entirety.

TECHNICAL FIELD

Examples described herein are generally related to verifying the integrity or compliance of models and data against laws.

BACKGROUND

Many industries are subject to regulation, and particularly legislation governing various aspects of the industry. For example, the banking industry, the housing industry, manufacturing industries, the aerospace industry are a few industries that are subject to laws governing aspects of the industry. When companies use models and data as part of their business, they must ensure that these models and data comply with the relevant laws. For example, banking companies that use credit scoring models must ensure that the credit scoring models comply with credit scoring legislation. The present disclosure is directed towards evaluating compliance of models and data with laws.

DETAILED DESCRIPTION

The present disclosure provides for the evaluation of models and/or data for compliance with laws. Said differently, embodiments of the present disclosure can be implemented to validate whether a model or whether data complies with laws. For example, the present disclosure could be implemented to validate a loan application scoring model against laws related to loan application scoring. This is just one example, however, and the present disclosure could be implemented to evaluate any of a variety of models against any of a variety of laws.

In some implementations, a decision model (e.g., loan application scoring model, or the like) can be deconstructed into a number of branching decisions. These branching decisions can be validated against laws (e.g., a canon of regulation, or the like) based on a determination of whether the branching decisions correspond to a Markov chain, where the Markov chain is generated based on the laws.

Figure 1:
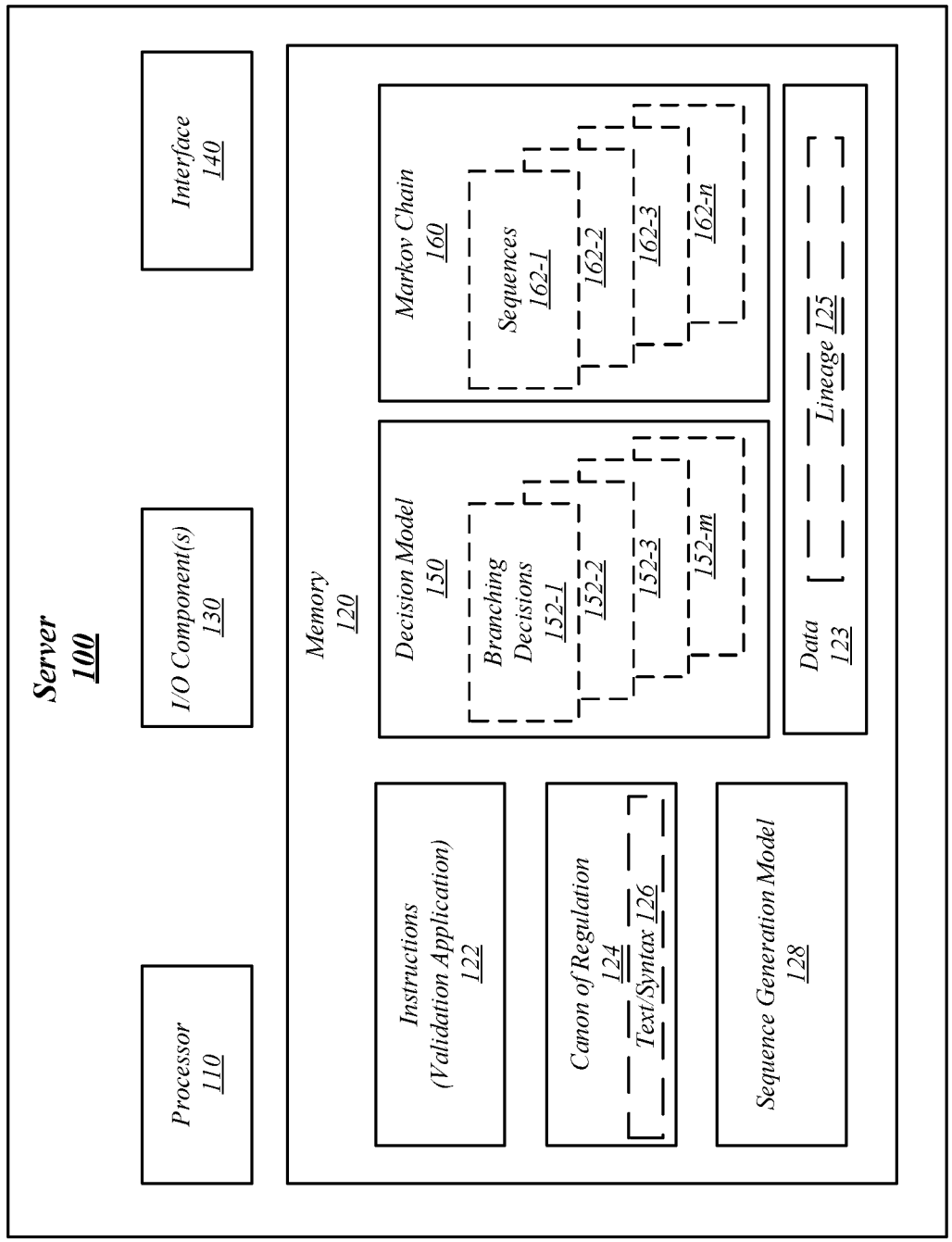
FIG. 1 illustrates an example computing device.

FIG. 1 illustrates an example server 100. In general, server 100 operates to validate models and/or data against laws. Server 100 could be a cloud based computing system, a dedicated server device, a workstation computer, a laptop computer, or the like.

The server 100 can include, at least in part, a processor 110, a memory 120, input/output (I/O) component(s) 130, and interface 140. Memory 120 may store instructions 122, which are executable by processor 110. Instructions 122 can correspond to a validation application. Memory 120 may further store canon of regulation 124, decision model 150, Markov chain 160, and sequence generation model 128.

In general, decision model 150 can be any of a variety of models used to make decisions. For example, decision model 150 could be a model used to determine whether to extend credit, or a loan scoring model. More particularly, decision model 150 could be used to determine whether to extend credit for a mortgage, an auto loan, a credit card, a personal loan, a business loan, or the like). As another example, decision model 150 could be a tenant application scoring model, a vehicle lease scoring model, or the like. As a further example, decision model 150 could be a model used in human resource decisions (e.g., performance review model, severance offer model, or the like). As a still further example, decision model 15 can be a targeted advertising model, a business forecasting model, or the like.

During operation of server 100, processor 110 can execute instructions 122 to receive decision model 150 (e.g., via interface 140). For example, processor 110 can receive decision model 150 via interface 140 from another computing device. Furthermore, processor 110, in executing instructions 122, can deconstruct decision model 150 into a number of branching decisions 152-$m$, where m is a positive integer, often greater than 1. This figure depicts decision model 150 storing branching decisions 152-1, 152-2, 152-3, and 152-$m$. It is noted however, that the number of branching decisions 152 with which decision model 150 can be deconstructed into can be any number and will vary based on the decision model 150 itself.

Processor 110 can execute instructions 122 to receive canon of regulation 124 (e.g., via interface 140). For example, processor 110 can receive canon of regulation 124 via interface 140 from another computing device. In general, canon of regulation 124 will correspond to laws related to decision model 150. For example, if decision model 150 is a model used to determine whether to grant a mortgage loan application; canon of regulation 124 can be laws related to granting mortgage loan applications.

Markov chain 160 can include a number of sequences 162-$n$, where n is a positive integer, often greater than 1. This figure depicts Markov chain including sequences 162-1, 162-2, 162-3, and 162-$m$. It is noted however, that the number of sequences 162 in Markov chain 160 can vary. Furthermore, it is noted that the number of sequences 162 does not need to equal the number of branching decisions 152. That is, m does not need to equal n. In fact, in some applications, m and n will be different.

In some implementations, processor 110 can execute instructions 122 to recognize text and syntax 126 from the canon of regulation 124. Furthermore, processor 110 can execute sequence generation model 128 to generate the Markov chain 160 (including sequences 162) from the text and syntax 126. With some examples, sequence generation model 128 can be a recursive neural network (RNN).

In some examples, canon of regulation 124 can include prohibitions or requirements. In some examples, canon of regulation 124 will include both prohibitions and requirements. Processor 110, in executing instructions 122, can generation Markov chain 160, and particularly sequences 162, from the prohibitions, requirements, or prohibitions and requirements.

Processor 110, in executing instructions 122, can determine whether ones of the branching decisions 152 match ones of the sequences 162. For example, processor 110 can execute instructions 122 to determine whether each of the branching decisions 152-$m$ matches at least one of the sequences 162-$n$. Said differently, processor 110 can execute instructions 122 to compare branching decisions 152 to sequences 162. Furthermore, processor 110 can execute instructions 122 to determine that the decision model 150 complies with that canon of regulation 124 based on the comparison. For example, processor 110 can execute instructions 122 to determine that the decision model 150 infringes the canon or regulation 124 based on a determination that at least one of the branching decisions 152 does not match at least one of the sequences 162 of the Markov chain 160. Alternatively, processor 110 can execute instructions 122 to determine that the decision model 150 complies with the canon or regulation 124 based on a determination that each of the branching decisions 152 matches at least one of the sequences 162 of the Markov chain 160.

With some examples, decision model 150 can be executed to generate an output (e.g., decision to extend credit, decision not to extend credit, or the like) based on input data 123. Processor 110, in executing instructions 122 can identify a lineage 125 of the input data 123 and can compare (e.g., match, or the like) the lineage 125 to at least one of the sequences 162 of the Markov chain 160. Furthermore, processor 110 can execute instructions 122 to determine that the decision model 150 complies (or not) with the canon or regulation 124 based on the comparison. In some examples, the lineage 125 of the input data 123 can include the source of the data, a privacy agreement associated with the data, the type of data (e.g., historical data, customer financial metrics, credit report data, or the like.

With some examples, the processor 110 may include circuity or processor logic, such as, for example, any of a variety of commercial processors. In some examples, the processor 110 may include multiple processors, a multithreaded processor, a multi-core processor (whether the multiple cores coexist on the same or separate dies), and/or a multi-processor architecture of some other variety by which multiple physically separate processors are in some way linked. Additionally, in some examples, the processor 110 may include graphics processing portions and may include dedicated memory, multiple-threaded processing and/or some other parallel processing capability.

The memory 120 may include logic, a portion of which includes arrays of integrated circuits, forming non-volatile memory to persistently store data or a combination of non-volatile memory and volatile memory. It is to be appreciated, that the memory 120 may be based on any of a variety of technologies. In particular, the arrays of integrated circuits included in memory 120 may be arranged to form one or more types of memory, such as, for example, dynamic random access memory (DRAM), NAND memory, NOR memory, or the like.

The I/O component(s) 130 may include one or more components to provide input to or to provide output from the server 100. For example, the I/O component(s) 130 may be a keyboard (hardware, virtual, etc.), mouse, joystick, microphone, track pad, button, touch layers of a display, haptic feedback device, camera, microphone, speaker, or the like.

Interface 140 may include logic and/or features to support a communication interface. For example, the interface 140 may include one or more interfaces that operate according to various communication protocols or standards to communicate over direct or network communication links. Direct communications may occur via use of communication protocols or standards described in one or more industry standards (including progenies and variants). For example, the interface 140 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like.

Figure 2:
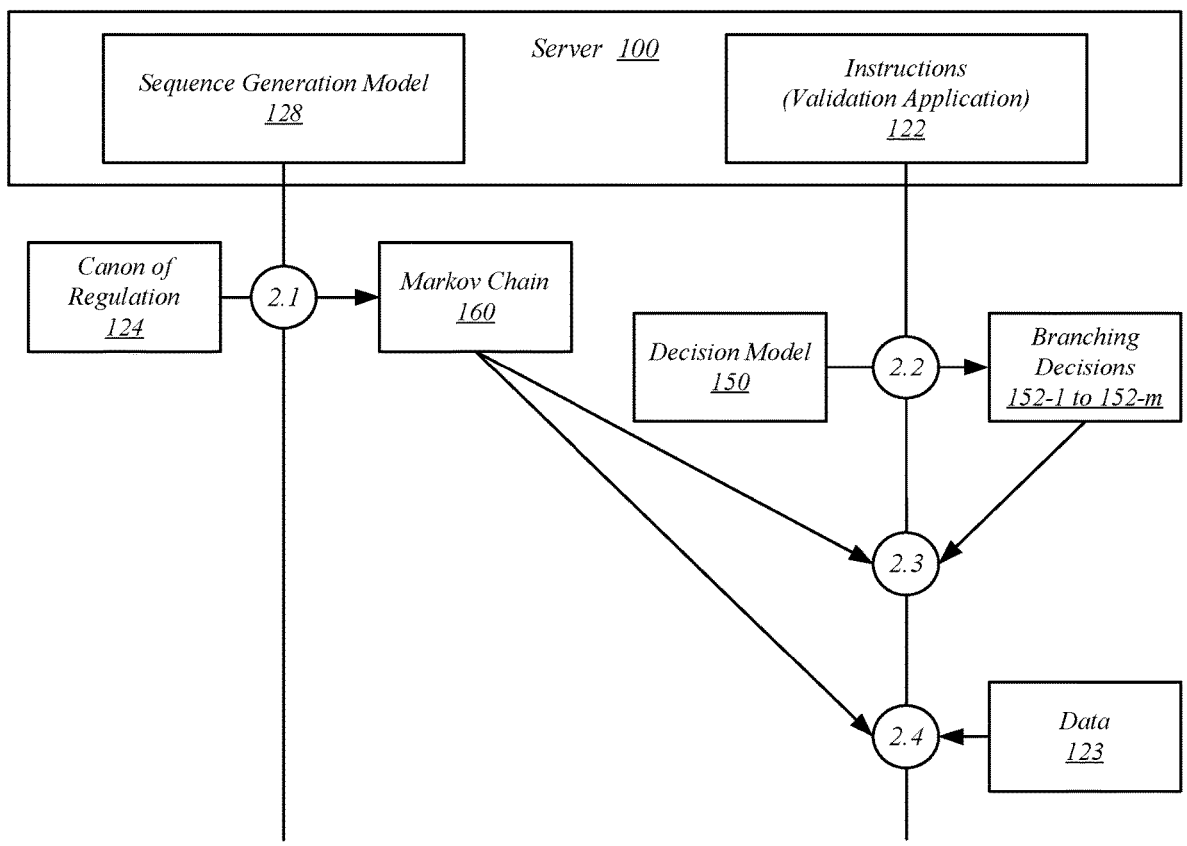
FIG. 2 illustrates a first example system.

FIG. 2 illustrates a technique 200 to validate a decision model against laws, or a canon of regulation. Technique 200 is described with reference to server 100 depicted in FIG. 1. However, technique 200 could be implemented by a computing system having a different configuration than depicted in this figure. Examples are not limited in this context. Technique 200 can begin at circle 2.1. At circle 2.1, server 100 can generate a Markov chain 160 having a number of sequences 162 (e.g., sequences 162-1 to 162-$n$ from a canon of regulation 124. For example, processor 110 of server 100, in executing sequence generation model 128 can generate Markov chain 160 including sequences 162-1, 162-2, 162-3, 162-$n$, etc. from canon of regulation 124.

Continuing to circle 2.2, server 100 can identify branching decisions 152-1 to 152-$m$ of decision model 150. For example, processor 110 of server 100, in executing instruction 122 can identify (or determine) branching decisions 152-1, 152-2, 152-3, 152-$m$, etc. of decision model 150.

Continuing to circle 2.3, server 100 can validate decision model 150 against canon of regulation 124. For example, server 100 can compare Markov chain 160 (which is based on canon of regulation 124) to decision model 150. More particularly, processor 110 of server 100, in executing instructions 122 can compare branching decisions 152 of decision model 150 to sequences 162 of Markov chain 160. Processor 110, in executing instructions 122 can determine whether decision model 150 complies with canon of regulation 124 based on the comparison.

Technique 200 can additionally include circle 2.4. At circle 2.4, server 100 can further validate decision model 150 against canon of regulation 124 by comparing data 123 to Markov chain 160. More particularly, processor 110 of server 100, in executing instructions 122 can compare data 123 (or lineage 125 of data 123) to sequences 162 of Markov chain 160. Processor 110, in executing instructions 122 can determine whether decision model 150 complies with canon of regulation 124 based on the comparison.

In some examples, processor 110, in executing instructions 122 can determine whether decision model 150 complies with the canon of regulation based on a fuzzy matching (e.g., between sequences of the Markov chain and branching decisions, lineage, or the like.). In further examples, processor 110, in executing instructions 122 can determine a probability of matching (e.g., based on the fuzzy matching, or the like) and can determine whether the overall decision model 150 complies with the canon of regulation based on whether the individual probabilities are greater than a threshold probability level.

FIGS. 3-6 illustrate logic flows, which may be implemented by a computing device (e.g., server 100) to validate a decision model against a canon of regulation. These logic flows are described with reference to server 100 of FIG. 1 for purposes of illustration. However, these logic flows can be implemented by a computing system having a different configuration than depicted in this figure.

Figure 3:
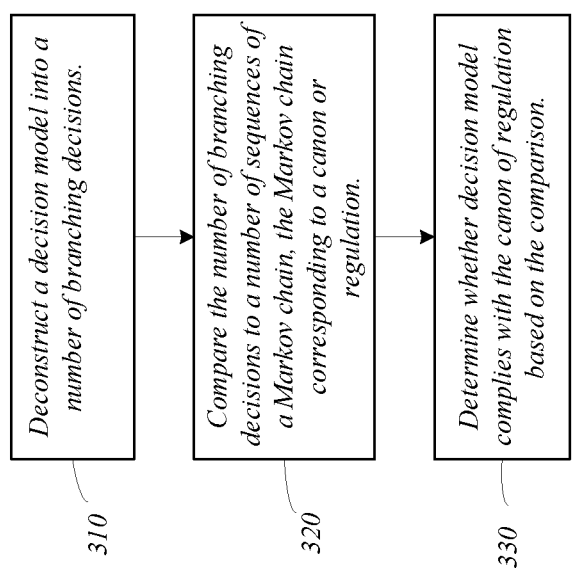
FIG. 3 illustrates portions of the first example system of FIG. 2 in greater detail.

Turning to FIG. 3 and logic flow 300; generally, logic flow 300 illustrates validating a decision model against a canon of regulation. Logic flow 300 can begin at block 310. At block 310 "deconstruct a decision model into a number of branching decisions" server 100 can deconstruct decision model 150 into branching decisions 152. For example, processor 110 in executing instructions 122 can deconstruct decision model 150 into branching decisions 152.

Continuing to block 320 "compare the number of branching decisions to a number of sequences of a Markov chain corresponding to a canon of regulation" server 100 can compare the branching decisions 152 (e.g., identified at block 310) to sequences 162 of a Markov chain 160 that corresponds to a canon of regulation 124. Examples of such a comparison are given in FIGS. 5 and 6.

Continuing to block 330 "determine whether the decision model complies with the canon of regulation based on the comparison" server 100 can determine whether the decision model 150 complies with the canon of regulation 124 based on the comparison from block 320. Examples of such a determination are given in FIGS. 5 and 6.

Figure 4:
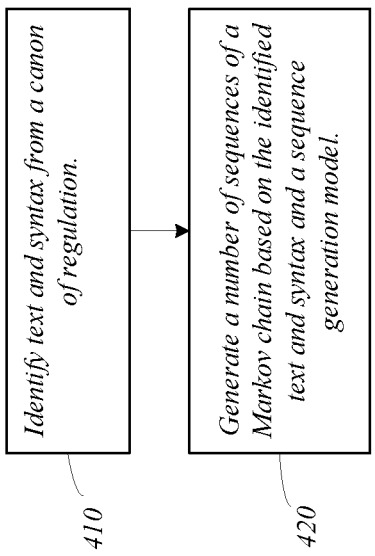
FIG. 4 illustrates an example technique to evaluate customer engagement models.

Turning to FIG. 4 and logic flow 400; generally, logic flow 400 illustrates generating a Markov chain including sequences from a canon of regulation. Logic flow 400 can begin at block 410. At block 410 "identify text and syntax from a canon of regulation" server 100 can identify text 126, syntax 126, or both text and syntax 126 from canon of regulation 124. For example, processor 110 in executing instructions 122 can identify text and syntax 126.

Continuing to block 420 "generate a number of sequences of a Markov chain based on the identified text and syntax and a sequences generation model" server 100 can generate sequences 162 of Markov chain 160 from executing sequences generation model 128 with the identified text and syntax 126 as input to the model 128.

Figure 5:
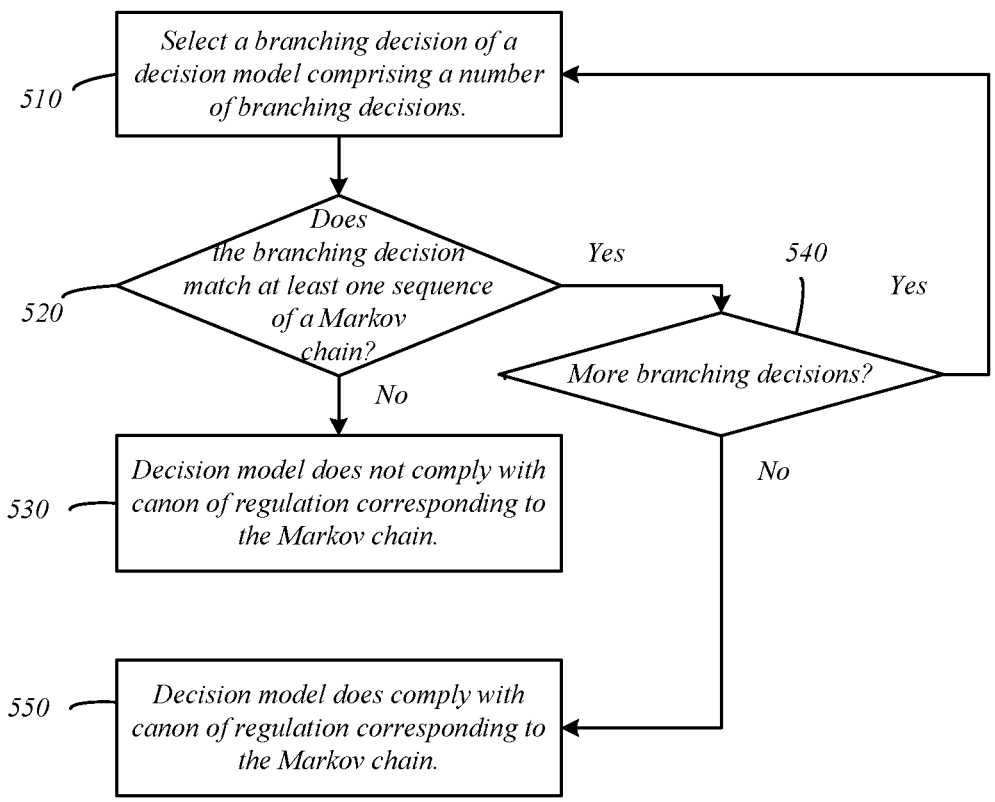
FIG. 5 illustrates a first example logic flow to generate a product offer.

Turning to FIG. 5 and logic flow 500; generally, logic flow 500 illustrates comparing branching decisions of a decision model to sequences of a Markov chain. Logic flow 500 can begin at block 510. At block 510 "select a branching decision of a decision model comprising a number of branching decisions" server 100 can select a branching decision 152 of decision model 150. For example, processor 110 in executing instructions 122 can select one of branching decisions 152-$m$ of decision model 150 with which to compare to Markov chain 160.

Continuing to decision block 520 "does the branching decision match at least one sequence of a Markov chain?" server 100 can determine whether the selected branching decision 152-$m$ of decision model 150 matches at least one sequences 162-$n$ of Markov chain 160. For example, processor 110 in executing instructions 122 can determine whether branching decision 152-$m$ matches (e.g., corresponds to, aligns with, does not violate, etc.) at least one sequence 162-$n$ of Markov chain 160.

From decision block 520, logic flow 500 can proceed to either block 530 or decision block 540. For example, logic flow 500 can proceed from decision block 520 to block 530 based on a determination at decision block 520 that the selected branching decision 152-$m$ does not match at least one sequence 162-$n$. Conversely, flow 500 can proceed from decision block 520 to decision block 540 based on a determination at decision block 520 that the selected branching decision 152-$m$ does match at least one sequence 162-$n$.

At block 530 "decision model does not comply with canon of regulation corresponding to the Markov chain" server 100 can determine that the decision model 150 does not comply with the canon of regulation 124, with which the Markov chain 160 corresponds. For example, processor 110, in executing instructions 122 can generate a flag, indication, user interface notice, or the like indicating that decision model 150 does not comply with the canon of regulation 124.

At decision block 540 "more branching decisions?" server 100 can determine whether more branching decision 152-$m$ remain to be selected. For example, processor 110 in executing instructions 122 can determine whether any of branching decision 152-$m$ of decision model 150 have yet to be compared with Markov chain 160 sequences 162 (e.g., at decision block 520).

From decision block 540, logic flow 500 can return to block 510 or continue to block 550. For example, logic flow 500 can return to block 510 from decision block 540 based on a determination at decision block 540 that more branching decision 152-$m$ remain to be selected. Conversely, flow 500 can proceed from decision block 540 to block 550 based on a determination at decision block 520 that no branching decision 152-$m$ remain to be selected.

At block 550 "decision model does comply with canon of regulation corresponding to the Markov chain" server 100 can determine that the decision model 150 does comply with the canon of regulation 124, with which the Markov chain 160 corresponds. For example, processor 110, in executing instructions 122 can generate a flag, indication, user interface notice, or the like indicating that decision model 150 does comply with the canon of regulation 124.

Figure 6:
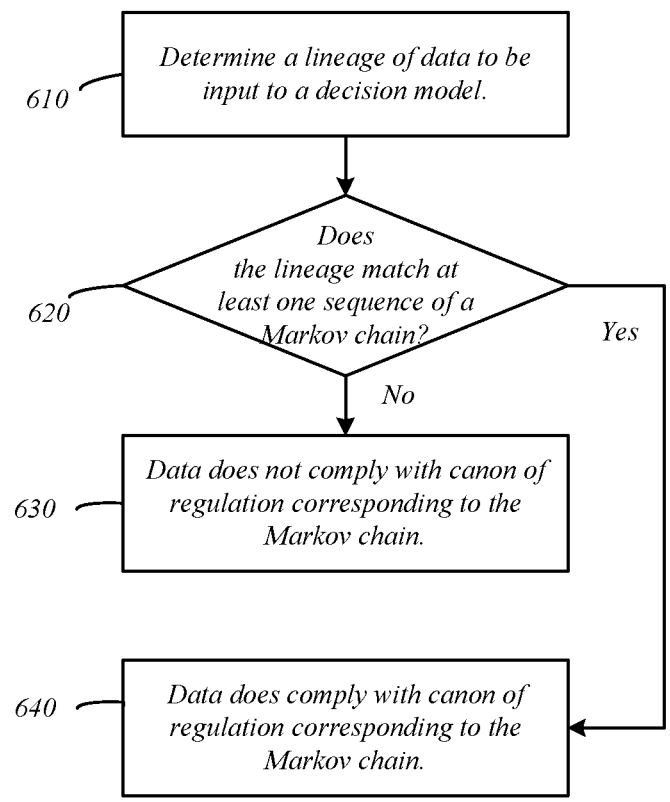
FIG. 6 illustrates a second example logic flow for adding or removing customer engagement models.

Turning to FIG. 6 and logic flow 600; generally, logic flow 600 illustrates comparing data (e.g., to be used as input to decision, or the like) with sequences of a Markov chain. Logic flow 600 can begin at block 610. At block 610 "determine a lineage of data to be input to a decision model" server 100 can determine a lineage 125 of data 123. For example, processor 110 in executing instructions 122 can determine a lineage 125 of data 123.

Continuing to decision block 620 "does the lineage match at least one sequence of a Markov chain?" server 100 can determine whether the lineage 125 of data 123 matches at least one sequences 162-$n$ of Markov chain 160. For example, processor 110 in executing instructions 122 can determine whether lineage 125 matches (e.g., corresponds to, aligns with, does not violate, etc.) at least one sequence 162-$n$ of Markov chain 160.

From decision block 620, logic flow 600 can proceed to either block 630 or block 640. For example, logic flow 600 can proceed from decision block 620 to block 630 based on a determination at decision block 620 that the lineage 125 does not match at least one sequence 162-$n$. Conversely, flow 600 can proceed from decision block 620 to block 640 based on a determination at decision block 620 that the lineage 125 does match at least one sequence 162-$n$.

At block 630 "data does not comply with canon of regulation corresponding to the Markov chain" server 100 can determine that the data 123 does not comply with the canon of regulation 124, with which the Markov chain 160 corresponds. For example, processor 110, in executing instructions 122 can generate a flag, indication, user interface notice, or the like indicating that data 123 does not comply with the canon of regulation 124.

At block 640 "data does comply with canon of regulation corresponding to the Markov chain" server 100 can determine that the data 123 does comply with the canon of regulation 124, with which the Markov chain 160 corresponds. For example, processor 110, in executing instructions 122 can generate a flag, indication, user interface notice, or the like indicating that data 123 does comply with the canon of regulation 124.

Figure 7:
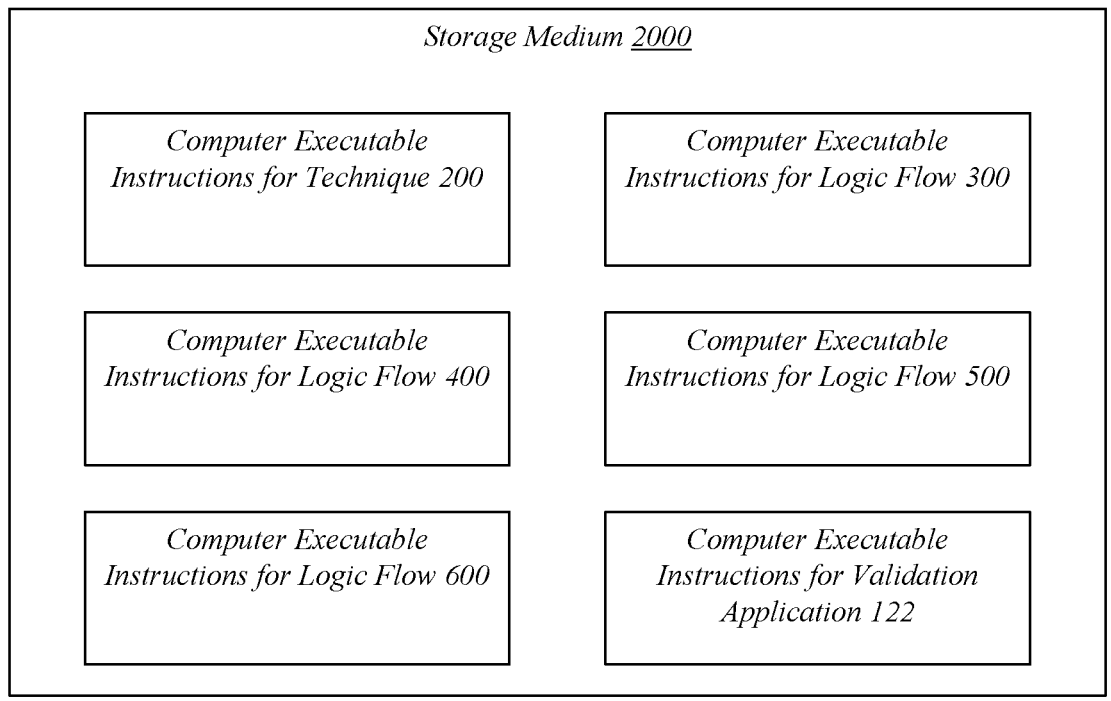
FIG. 7 illustrates an example storage medium.

FIG. 7 illustrates an embodiment of a storage medium 2000. Storage medium 2000 may comprise any non-transitory computer-readable storage medium or machine-readable storage medium, such as an optical, magnetic or semiconductor storage medium. In various embodiments, storage medium 2000 may comprise an article of manufacture. In some embodiments, storage medium 2000 may store computer-executable instructions, such as computer-executable instructions to implement one or more of techniques, logic flows, or operations described herein, such as with respect to 200, 300, 400, 500, and/or 600 of FIGS. 2 to 6. The storage medium 2000 may further store computer-executable instructions for the validation application 122. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
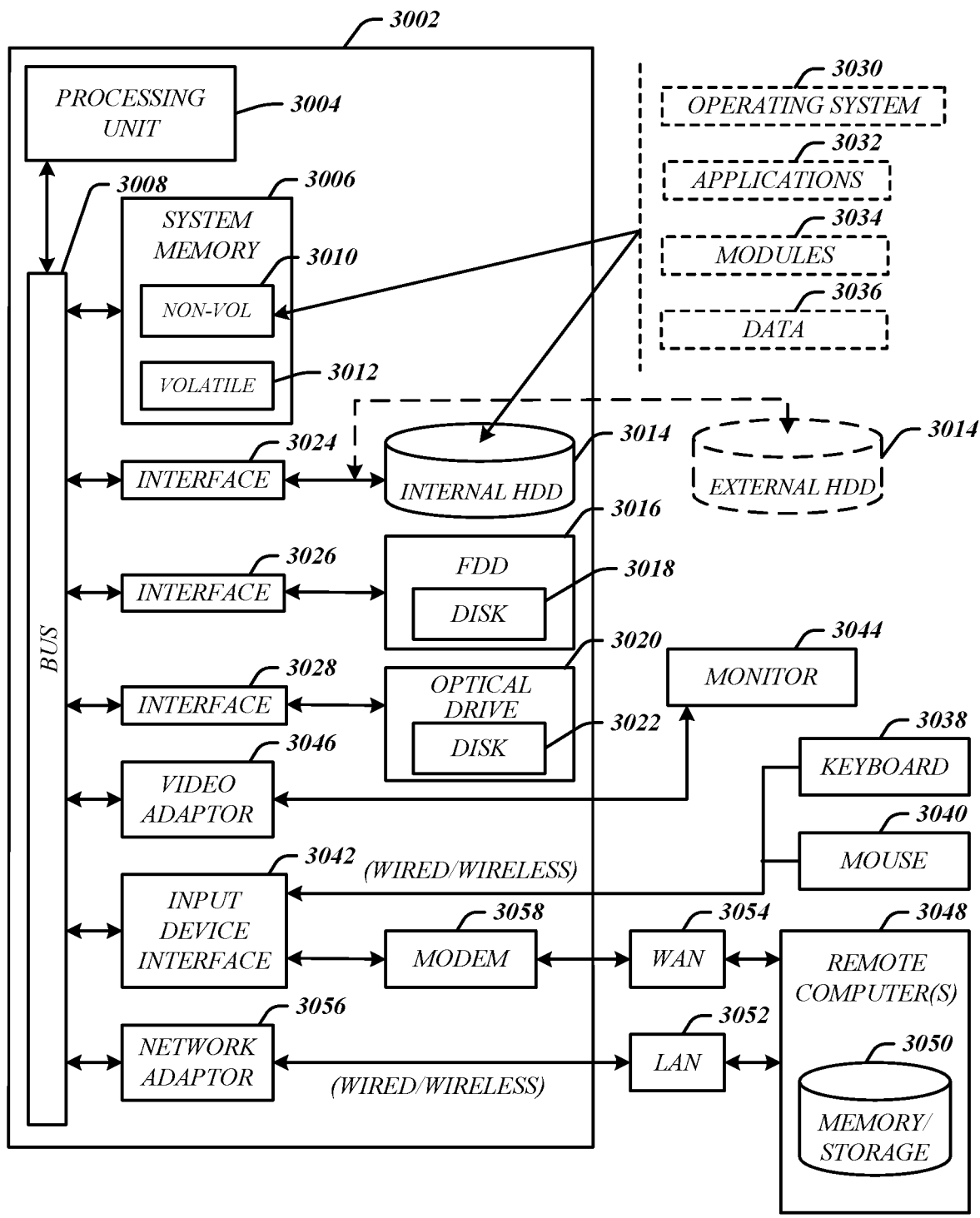
FIG. 8 illustrates an example computer architecture.

FIG. 8 illustrates an embodiment of an exemplary computing architecture 3000 that may be suitable for implementing various embodiments as previously described. In various embodiments, the computing architecture 3000 may comprise or be implemented as part of an electronic device. In some embodiments, the computing architecture 3000 may be representative, for example, of a computing device that implements one or more components of server 100. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 3000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 3000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 3000.

As shown in this figure, the computing architecture 3000 comprises a processing unit 3004, a system memory 3006 and a system bus 3008. The processing unit 3004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 3004.

The system bus 3008 provides an interface for system components including, but not limited to, the system memory 3006 to the processing unit 3004. The system bus 3008 can be any of several types of bus structure that may further interconnect to a memory bus (with or without a memory controller), a peripheral bus, and a local bus using any of a variety of commercially available bus architectures. Interface adapters may connect to the system bus 3008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 3006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in this figure, the system memory 3006 can include non-volatile memory 3010 and/or volatile memory 3012. A basic input/output system (BIOS) can be stored in the non-volatile memory 3010.

The computer 3002 may include various types of computer-readable storage media in the form of one or more lower speed memory units, including an internal (or external) hard disk drive (HDD) 3014, a magnetic floppy disk drive (FDD) 3016 to read from or write to a removable magnetic disk 3018, and an optical disk drive 3020 to read from or write to a removable optical disk 3022 (e.g., a CD-ROM or DVD). The HDD 3014, FDD 3016 and optical disk drive 3020 can be connected to the system bus 3008 by a HDD interface 3024, an FDD interface 3026 and an optical drive interface 3028, respectively. The HDD interface 3024 for external drive implementations can include at least one or both of Universal Serial Bus (USB) and IEEE interface technologies.

The drives and associated computer-readable media provide volatile and/or nonvolatile storage of data, data structures, computer-executable instructions, and so forth. For example, a number of program modules can be stored in the drives and memory units 3010, 3012, including an operating system 3030, one or more application programs 3032, other program modules 3034, and program data 3036. In one embodiment, the one or more application programs 3032, other program modules 3034, and program data 3036 can include, for example, the various applications and/or components of the wire-free charging system 100.

A user can enter commands and information into the computer 3002 through one or more wire/wireless input devices, for example, a keyboard 3038 and a pointing device, such as a mouse 3040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 3004 through an input device interface 3042 that is coupled to the system bus 3008 but can be connected by other interfaces such as a parallel port, IEEE 994 serial port, a game port, a USB port, an IR interface, and so forth.

A monitor 3044 or other type of display device is also connected to the system bus 3008 via an interface, such as a video adaptor 3046. The monitor 3044 may be internal or external to the computer 3002. In addition to the monitor 3044, a computer typically includes other peripheral output devices, such as speakers, printers, and so forth.

The computer 3002 may operate in a networked environment using logical connections via wire and/or wireless communications to one or more remote computers, such as a remote computer 3048. The remote computer 3048 can be a workstation, a server computer, a router, a personal computer, portable computer, microprocessor-based entertainment appliance, a peer device or other common network node, and typically includes many or all of the elements described relative to the computer 3002, although, for purposes of brevity, only a memory/storage device 3050 is illustrated. The logical connections depicted include wire/wireless connectivity to a local area network (LAN) 3052 and/or larger networks, for example, a wide area network (WAN) 3054. Such LAN and WAN networking environments are commonplace in offices and companies, and facilitate enterprise-wide computer networks, such as intranets, all of which may connect to a global communications network, for example, the Internet.

When used in a LAN networking environment, the computer 3002 is connected to the LAN 3052 through a wire and/or wireless communication network interface or adaptor 3056. The adaptor 3056 can facilitate wire and/or wireless communications to the LAN 3052, which may also include a wireless access point disposed thereon for communicating with the wireless functionality of the adaptor 3056.

When used in a WAN networking environment, the computer 3002 can include a modem 3058, or is connected to a communications server on the WAN 3054, or has other means for establishing communications over the WAN 3054, such as by way of the Internet. The modem 3058, which can be internal or external and a wire and/or wireless device, connects to the system bus 3008 via the input device interface 3042. In a networked environment, program modules depicted relative to the computer 3002, or portions thereof, can be stored in the remote memory/storage device 3050. It will be appreciated that the network connections shown are exemplary and other means of establishing a communications link between the computers can be used.

The computer 3002 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

What is claimed is:

1. An apparatus, comprising:
a processor; and
a memory coupled to the processor, the memory comprising instructions that when executed by the processor cause the processor to:
identify a lineage of a set of input data, the set of input data associated with a decision model, wherein the decision model is arranged to generate at least one output from the set of inputs;
receive an information element comprising indications of a canon of regulation, the canon of regulation comprising a plurality of requirements and a plurality of prohibitions;
recognize text and syntax from the canon of regulation;
generate a Markov chain comprising a plurality of sequences, wherein ones of the plurality of sequences of the Markov chain correspond to the plurality of requirements and other ones of the plurality of sequences of the Markov chain correspond to the plurality of prohibitions; and
determine whether the decision model infringes the canon of regulation based on the lineage of the set of input data and the plurality of sequences of the Markov chain.

2. The apparatus of claim 1, the memory further comprising instructions that when executed by the processor cause the processor to:
determine whether the lineage of the set of input data matches at least one of the plurality of sequences of the Markov chain; and
determine that the decision model infringes the canon of regulation based on a determination that the lineage of the set of input data matches at least one of the plurality of sequences of the Markov chain.

3. The apparatus of claim 1, the memory further comprising instructions that when executed by the processor cause the processor to:
determine whether the lineage of the set of input data matches at least one of the plurality of sequences of the Markov chain; and
determine that the decision model does not infringe the canon of regulation based on a determination that the lineage of the set of input data does not match at least one of the plurality of sequences of the Markov chain.

4. The apparatus of claim 1, the memory further comprising instructions that when executed by the processor cause the processor to:
    deconstruct the decision model into a plurality of branching decisions; and
    determine whether the decision model infringes the canon of regulation based on the plurality of branching decisions and the plurality of sequences of the Markov chain.

5. The apparatus of claim 4, the memory further comprising instructions that when executed by the processor cause the processor to:
    determine, for each of the plurality of branching decisions, whether the branching decision matches at least one of the plurality of sequences of the Markov chain; and
        determine that the decision model infringes the canon of regulation based on a determination that the plurality of branching decisions matches at least one of the plurality of sequences of the Markov chain; or
        determine that the decision model does not infringe the canon of regulation based on a determination that the plurality of branching decisions do not match at least one of the plurality of sequences of the Markov chain.

6. The apparatus of claim 1, the memory further comprising instructions that when executed by the processor cause the processor to match the lineage of the set of input data to at least one of the plurality of sequences of the Markov chain based on a fuzzy logic algorithm or based on a neural network.

7. At least one non-transitory machine-readable storage medium comprising instructions that when executed by a processor at a computing platform, cause the processor to:
    identify a lineage of a set of input data, the set of input data associated with a decision model, wherein the decision model is arranged to generate at least one output from the set of inputs;
    receive an information element comprising indications of a canon of regulation, the canon of regulation comprising a plurality of requirements and a plurality of prohibitions;
    recognize text and syntax from the canon of regulation;
    generate a Markov chain comprising a plurality of sequences, wherein ones of the plurality of sequences of the Markov chain correspond to the plurality of requirements and other ones of the plurality of sequences of the Markov chain correspond to the plurality of prohibitions; and
    determine whether the decision model infringes the canon of regulation based on the lineage of the set of input data and the plurality of sequences of the Markov chain.

8. The at least one non-transitory machine-readable storage medium of claim 7, comprising instructions that further cause the processor to:
    determine whether the lineage of the set of input data matches at least one of the plurality of sequences of the Markov chain; and
    determine that the decision model infringes the canon of regulation based on a determination that the lineage of the set of input data matches at least one of the plurality of sequences of the Markov chain.

9. The at least one non-transitory machine-readable storage medium of claim 7, comprising instructions that further cause the processor to:
    determine whether the lineage of the set of input data matches at least one of the plurality of sequences of the Markov chain; and
    determine that the decision model does not infringe the canon of regulation based on a determination that the lineage of the set of input data does not match at least one of the plurality of sequences of the Markov chain.

10. The at least one non-transitory machine-readable storage medium of claim 7, comprising instructions that further cause the processor to:
    deconstruct the decision model into a plurality of branching decisions; and
    determine whether the decision model infringes the canon of regulation based on the plurality of branching decisions and the plurality of sequences of the Markov chain.

11. The at least one non-transitory machine-readable storage medium of claim 10, comprising instructions that further cause the processor to:
    determine, for each of the plurality of branching decisions, whether the branching decision matches at least one of the plurality of sequences of the Markov chain; and
    determine that the decision model infringes the canon of regulation based on a determination that the plurality of branching decisions matches at least one of the plurality of sequences of the Markov chain; or
    determine that the decision model does not infringe the canon of regulation based on a determination that the plurality of branching decisions do not match at least one of the plurality of sequences of the Markov chain.

12. The at least one non-transitory machine-readable storage medium of claim 7, comprising instructions that further cause the processor to match the lineage of the set of input data to at least one of the plurality of sequences of the Markov chain based on a fuzzy logic algorithm or based on a neural network.

13. The at least one non-transitory machine-readable storage medium of claim 7, comprising instructions that further cause the processor to input the recognized text and syntax to a recursive neural network (RNN) to generate the Markov chain comprising the plurality of sequences.

14. A computer implemented method, comprising:
    identifying a lineage of a set of input data, the set of input data associated with a decision model, wherein the decision model is arranged to generate at least one output from the set of inputs;
    receiving an information element comprising indications of a canon of regulation, the canon of regulation comprising a plurality of requirements and a plurality of prohibitions;
    recognizing text and syntax from the canon of regulation;
    generating a Markov chain comprising a plurality of sequences, wherein ones of the plurality of sequences of the Markov chain correspond to the plurality of requirements and other ones of the plurality of sequences of the Markov chain correspond to the plurality of prohibitions; and
    determining whether the decision model infringes the canon of regulation based on the lineage of the set of input data and the plurality of sequences of the Markov chain.

15. The computer implemented method of claim 14, wherein determining whether that the decision model infringes the canon of regulation based on the lineage of the set of input data and the plurality of sequences of the Markov chain comprises:

determining whether the lineage of the set of input data matches at least one of the plurality of sequences of the Markov chain; and determining that the decision model infringes the canon of regulation based on a determination that the lineage of the set of input data matches at least one of the plurality of sequences of the Markov chain.

16. The computer implemented method of claim 14, wherein determining whether the decision model infringes the canon of regulation based on the lineage of the set of input data and the plurality of sequences of the Markov chain comprises:

determining whether the lineage of the set of input data matches at least one of the plurality of sequences of the Markov chain; and determining that the decision model does not infringe the canon of regulation based on a determination that the lineage of the set of input data does not match at least one of the plurality of sequences of the Markov chain.

17. The computer implemented method of claim 14, comprising:

deconstructing the decision model into a plurality of branching decisions; and determining that the decision model infringes the canon of regulation based on the plurality of branching decisions and the plurality of sequences of the Markov chain.

18. The computer implemented method of claim 17, wherein determining whether that the decision model infringes the canon of regulation based on the plurality of branching decisions and the plurality of sequences of the Markov chain comprises:

determining, for each of the plurality of branching decisions, whether the branching decision matches at least one of the plurality of sequences of the Markov chain; and determining that the decision model infringes the canon of regulation based on a determination that the plurality of branching decisions matches at least one of the plurality of sequences of the Markov chain; or determining that the decision model does not infringe the canon of regulation based on a determination that the plurality of branching decisions do not match at least one of the plurality of sequences of the Markov chain.

19. The computer implemented method of claim 14, wherein the decision model is a customer engagement model, a targeted advertising model, a business forecasting model, or a loan scoring model.

20. The computer implemented method of claim 14, comprising inputting the recognized text and syntax to a recursive neural network (RNN) to generate the Markov chain comprising the plurality of sequences.

* * * * *